United States Patent
Min et al.

(10) Patent No.: US 8,014,466 B2
(45) Date of Patent: Sep. 6, 2011

(54) WIDE-BAND DIRECT CONVERSION TRANSMISSION APPARATUS

(75) Inventors: Jun Ki Min, Gyunggi-Do (KR); Jong Sik Kim, Gyunggi-Do (KR); Hyun Chol Shin, Seoul (KR); Jeong Suk Lee, Gyunggi-Do (KR)

(73) Assignee: Samsung Electro-Mechanics, Ltd., Gyunggi-do (KR)

( * ) Notice: Subject to any disclaimer, the term of this patent is extended or adjusted under 35 U.S.C. 154(b) by 576 days.

(21) Appl. No.: 12/194,896

(22) Filed: Aug. 20, 2008

(65) Prior Publication Data

US 2009/0067536 A1 Mar. 12, 2009

(30) Foreign Application Priority Data

Sep. 11, 2007 (KR) .................. 10-2007-0092168

(51) Int. Cl.
*H04L 27/00* (2006.01)
(52) U.S. Cl. .......... 375/295; 375/307; 375/298; 455/85; 455/86; 455/146; 455/209; 455/255; 331/45; 331/50

(58) Field of Classification Search .................. 375/298, 375/295, 307; 331/46, 50, 107 D; 455/85, 455/86, 146, 209, 255, 258, 315; 332/141
See application file for complete search history.

(56) References Cited

U.S. PATENT DOCUMENTS 6,148,181 A * 11/2000 Otaka .............................. 455/86
2007/0259643 A1* 11/2007 Wu ................................ 455/315
* cited by examiner

*Primary Examiner* — Dac V Ha
*Assistant Examiner* — Rahel Guarino
(74) *Attorney, Agent, or Firm* — Lowe, Hauptman, Ham & Berner, LLP

(57) ABSTRACT

There is provided a wide-band direct conversion transmitting apparatus including: a local oscillation unit generating first, second, and third oscillation signal pairs each including a pair of signals having a phase difference of 90°; an image rejection mixer unit mixing baseband transmission signals including an I signal and a Q signal having a phase difference of 90° with the first oscillation signal pair; a harmonic rejection mixer unit mixing each of the first, second, and third oscillation signal pairs with the baseband transmission signals; and an output signal selecting unit selecting output signals from the image rejection mixer unit or from the harmonic rejection mixer unit.

11 Claims, 8 Drawing Sheets

WIDE-BAND DIRECT CONVERSION TRANSMISSION APPARATUS

CROSS-REFERENCE TO RELATED APPLICATIONS

This application claims the priority of Korean Patent Application No. 2007-0092168 filed on Sep. 11, 2007, in the Korean Intellectual Property Office, the disclosure of which is incorporated herein by reference.

BACKGROUND OF THE INVENTION

1. Field of the Invention

The present invention relates to wide-band direct conversion transmission apparatuses that can be applied to wireless mobile terminals for WLAN, WiMAX, or mobile broadcasting systems, and more particularly, to a wide-band direct conversion transmission apparatus that can be used in a wide band, where the maximum carrier frequency is three times higher than the minimum carrier frequency, and remove in-band harmonic components and out-of-band harmonic components.

2. Description of the Related Art

In general, a direct-conversion transmitter converts a base-band signal into a carrier frequency through a single frequency conversion. The up-conversion transmitter is applied to a CDMA terminal using a frequency of approximately 800 MHz, a PCS terminal using a frequency of approximately 1.9 GHz, or a Wireless LAN (WLAN) using a frequency of approximately 2.4 GHz. A conventional narrow-band direct-conversion transmitter according to the related art has been widely used for those applications.

FIG. 1 is a block diagram illustrating a narrow-band direct conversion transmitting apparatus according to the related art.

Referring to FIG. 1, a narrow-band direct conversion transmitting apparatus according to the related art includes a first low-pass filter 11, a second low-pass filter 12, a first mixer 21, a second mixer 22, a local oscillator 31, a local oscillation generator 32, a driver amplifier 41, a power amplifier 42, and a bandpass filter 43. The first low-pass filter 11 that performs low-pass filtering of an I signal among transmission signals including the I signal and a Q signal having a phase difference of 90°. The second low-pass filter 12 performs low-pass filtering of the Q signal. The first mixer 21 mixes the I signal from the first low-pass filter and a first local oscillation signal LI to generate a first RF signal RF1. The second mixer 22 mixes the Q signal from the second low-pass filter 12 and a second oscillation signal LQ to generate a second RF signal RFQ. The local oscillator 31 generates an oscillation signal. The local oscillation generator 32 generates the first and second local oscillation signals LI and LQ by using the oscillation signal from the local oscillator 31. The driver amplifier 41 amplifies an RF signal obtained by adding the first RF signal RFI from the first mixer 21 and the second RF signal RFQ from the second mixer 22. The power amplifier 42 amplifies the RF signal from the driver amplifier 41. The bandpass filter 43 performs band filtering of the RF signal between the power amplifier 42 and an antenna ANT.

In FIG. 1, the first and second mixers 21 and 22 mix a baseband frequency and the local oscillation frequency from the local oscillator 31 to perform up-conversion.

A signal obtained by the up-conversion generally includes odd harmonic components of the oscillation frequency of the local oscillator 31. The up-converted signal including the harmonics passes through the driver amplifier 41 and the power amplifier 42, such that a signal having an appropriate amplitude to be transmitted is produced.

The output signal of the power amplifier 42 includes desired fundamental frequency signals and various harmonic components. When the output signal passes through the bandpass filter 43, the bandpass filter 43 attenuates the signals out of a desired band, and the in-band signal is transmitted through the antenna ANT.

Therefore, in the narrow-band communication system, shown in FIG. 1, the harmonic components caused by the frequency up-conversion by mixers 21 and 22 do not affect another communication system.

FIG. 2 is a conceptual diagram illustrating a frequency spectrum of an output signal and a filtering function of the bandpass filter in the narrow-band direct conversion transmitting apparatus of FIG. 1.

As described above, in FIG. 2, the harmonic components included at the output of the power amplifier are attenuated by the bandpass filter.

As shown in FIG. 1, when a communication is performed using the narrow-band direct conversion transmitter according to the related art, the harmonic components do not interfere another channel because the harmonic components reside on the outside of the used band. Therefore, the harmonic components of the RF frequency that is generated by the up-conversion mixer do not make any harmful impact on the communication.

However, with the development of the modern information society, there have been an increasing need for effective data transfer and an increasing demand for data and video information. Therefore, a need for an increase in data rate has been also increasing rapidly.

In order to achieve the high data rate, the communication frequency band needs to be increased, and thus a wide-band wireless communication system has attracted much attention.

For example, in a wide communication frequency band where a maximum frequency is three or more times higher than a minimum frequency, odd harmonics of an output transmission signal may fall in the same communication frequency band, and as a result degrade the signal-to-noise ratio (SNR) of an adjacent user and deteriorate the quality of the adjacent user's communication in a different channel but still in the same frequency band.

FIG. 3 is a frequency spectrum diagram illustrating an output signal that is up-converted in a wide-band communication.

As shown in FIG. 3, in a wide-band communication system whose bandwidth is so broad to include the third and higher harmonics of an output frequency, the harmonic components fall within the communication frequency band, and thus interfere other channels in the corresponding frequencies within the same communication band.

In order to avoid the problem in the wide-band communication environment, when the transmitting apparatus, shown in FIG. 1, is set to use a different channel frequency, the center frequency of the bandpass filter needs to be varied according to the change in the channel frequency.

However, the center frequency of an off-chip bandpass filter is usually fixed. Therefore, it is impossible to use the narrow-band transmitting apparatus according to the related art, shown in FIG. 1, for the wide-band communication environment of FIG. 3.

SUMMARY OF THE INVENTION

An aspect of the present invention provides a wide-band direct conversion transmitting apparatus that can be used in a wide band where a maximum frequency is three or more times higher than a minimum frequency, and remove in-band harmonic components and out-of-band harmonic components without using off-chip bandpass filters.

According to an aspect of the present invention, there is provided a wide-band direct conversion transmitting apparatus including: a local oscillation unit generating first, second, and third oscillation signal pairs each including a pair of signals having a phase difference of 90°; an image rejection mixer unit mixing baseband transmission signals including an I signal and a Q signal having a phase difference of 90° with the first oscillation signal pair; a harmonic rejection mixer unit mixing each of the first, second, and third oscillation signal pairs with the baseband transmission signals; and an output signal selecting unit selecting output signals from the image rejection mixer unit or output signals from the harmonic rejection mixer unit.

The local oscillation unit may include: an oscillator generating an oscillation frequency; and an oscillation generator generating the first, second, and the third oscillation signal pairs by using the oscillation frequency from the oscillator.

The image rejection mixer unit may include a first mixer mixing the I signal of the baseband signals with a first oscillation signal of the first oscillation signal pair; and a second mixer mixing the Q signal of the baseband signals with a second oscillation signal of the first oscillation signal pair.

The harmonic rejection mixer unit may include: a first harmonic rejection mixer mixing a first oscillation signal of each of the first, second, and third oscillation signal pairs with the baseband transmission signals; and a second harmonic rejection mixer mixing a second oscillation signal of each of the first, second, and third oscillation signal pairs with the baseband transmission signals.

The first harmonic rejection mixer may include: a load circuit connected to a power source terminal; a Gilbert-cell circuit connected to the load circuit, switched on according to the first oscillation signal of each of the first, second, and third oscillation signal pairs, and mixing the first oscillation signal of each of the first, second, and third oscillation signal pairs with the transmission signals; and a current source circuit connected between the Gilbert-cell circuit and a ground terminal.

The second harmonic rejection mixer may include: a load circuit connected to a power source terminal; a Gilbert-cell circuit connected to the load circuit, switched on according to the second oscillation signal of each of the first, second, and third oscillation signal pairs, and mixing the second oscillation signal of each of the first, second, and third oscillation signals with the transmission signals.

The output signal selecting unit may include: first and second switches switched on when a high band is selected in a predetermined total frequency band, and selecting output signals from the image rejection mixer unit; and a third switch switched on when a low band is selected in the total frequency band, and selecting output signals from the harmonic rejection mixer unit.

The wide-band direct conversion transmitting apparatus may further include a tunable filter connected between the harmonic rejection mixer unit and the third switch and removing harmonic components of the up-converted signals created by the harmonic rejection mixer unit.

The tunable filter may remove the second and higher harmonics of the output signal from the harmonic rejection mixer unit.

The wide-band direct conversion transmitting apparatus may further include: a first low-pass filter passing the I signal of the transmission signals to the image rejection mixer unit and the harmonic rejection mixer unit; and a second low-pass filter passing the Q signal of the transmission signals to the image rejection mixer unit and the harmonic rejection mixer unit.

The wide-band direct conversion transmitting apparatus may further include: a fixed filter passing the signals selected by the output signal selecting unit within the predetermined frequency band; and a driver amplifier amplifying the signals fed by the fixed filter.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
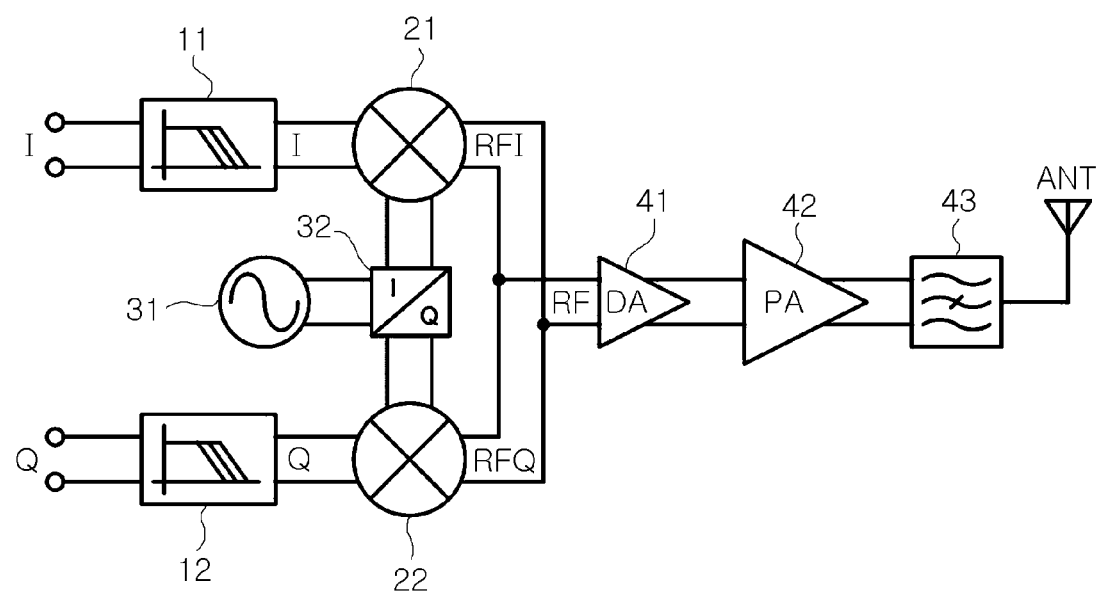
FIG. 1 is a configuration view illustrating a narrow-band direct conversion transmitting apparatus according to the related art.
Figure 2:
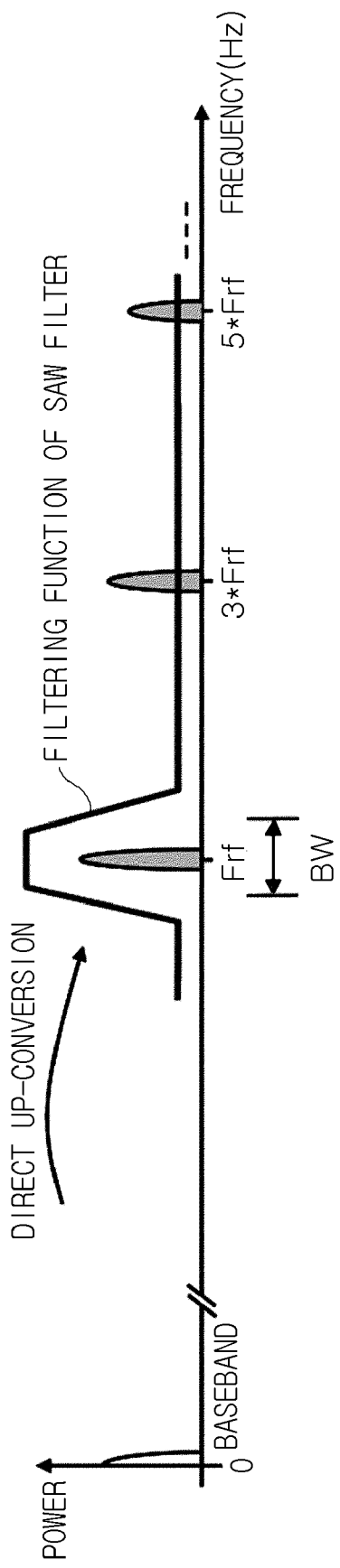
FIG. 2 is a view illustrating a frequency spectrum of an output signal and a filtering operation of a bandpass filter in the narrow-band direct conversion transmitting apparatus of FIG. 1.
Figure 3:
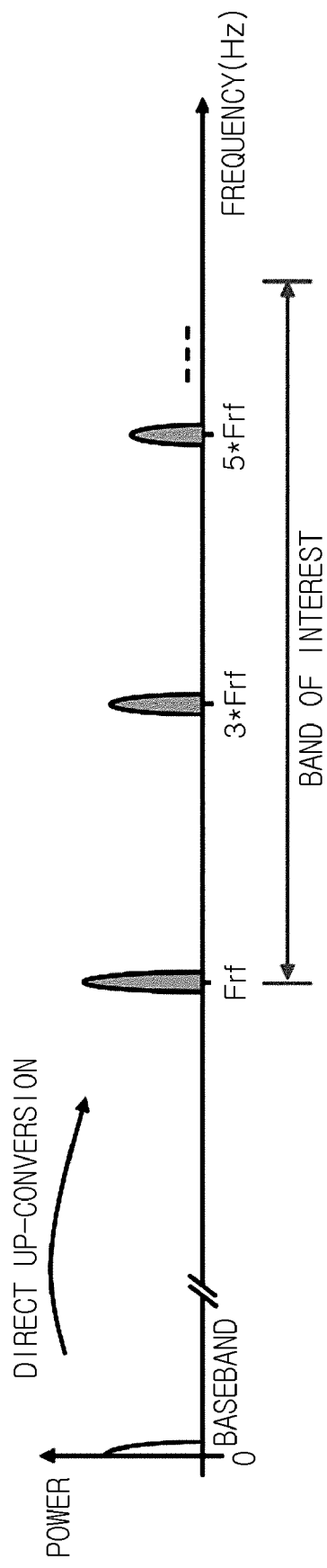
FIG. 3 is a frequency spectrum diagram illustrating an output signal that is up-converted in a wide-band communication band.

Exemplary embodiments of the present invention will now be described in detail with reference to the accompanying drawings.

The invention may however be embodied in many different forms and should not be construed as limited to the embodiments set forth herein. Rather, these embodiments are provided so that this disclosure will be thorough and complete, and will fully convey the scope of the invention to those skilled in the art. Also, in the drawings, the same reference numerals are used throughout to designate the same components.

Figure 4:
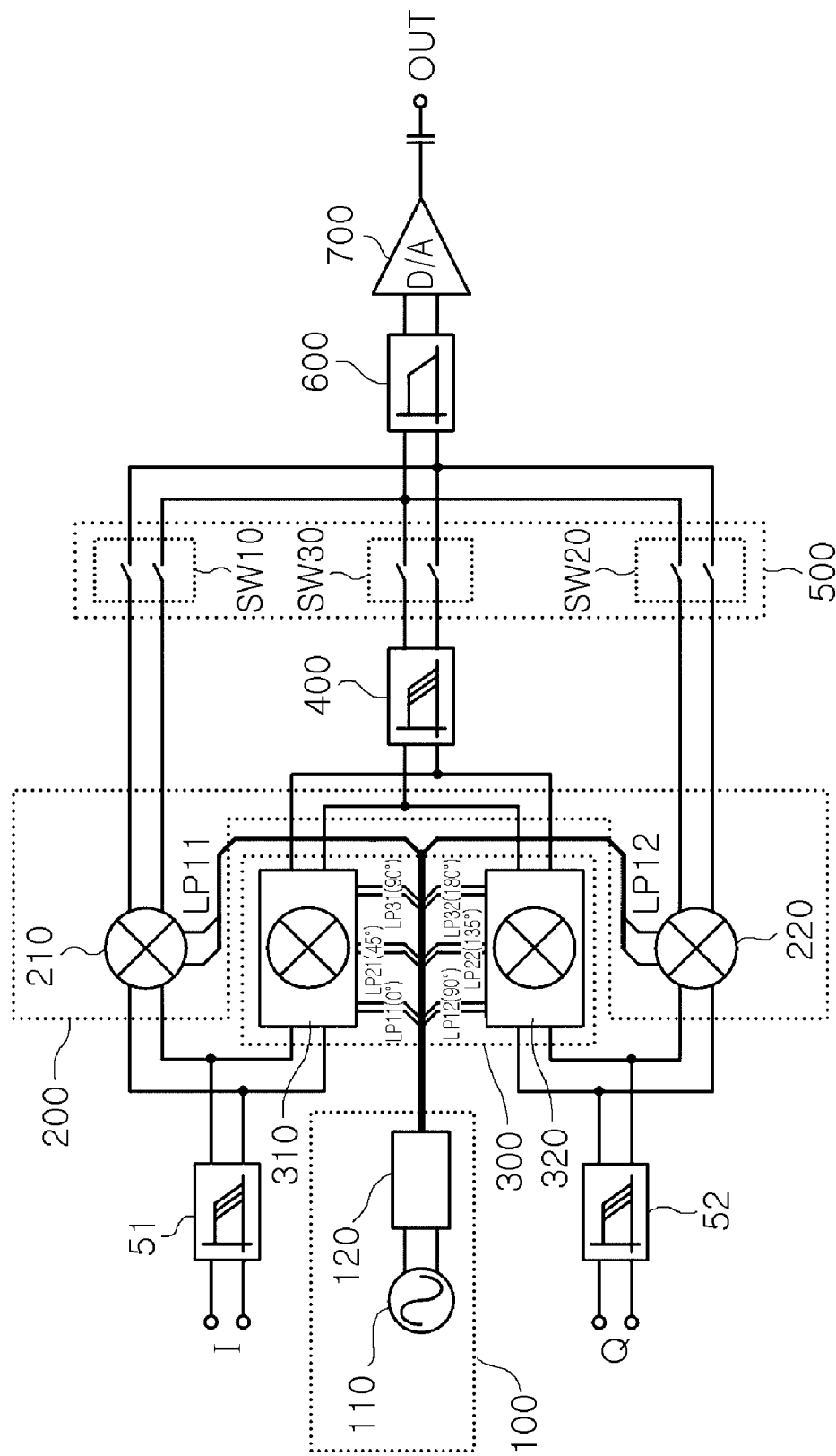
FIG. 4 is a block diagram illustrating a wide-band direct conversion transmitting apparatus according to an exemplary embodiment of the present invention.

FIG. 4 is a configuration view illustrating a wide-band direct conversion transmitting apparatus according to an exemplary embodiment of the invention.

Referring to FIG. 4, a wide-band direct conversion transmitting apparatus according to this embodiment includes a local oscillation unit 100, an image rejection mixer unit 200, a harmonic rejection mixer unit 300, and an output signal selecting unit 500.

Further, the wide-band direct conversion transmitting apparatus according to this embodiment of the invention includes a first low-pass filter 51 and a second low-pass filter 52. The first low-pass filter 51 passes an I signal among transmission signals through the image rejection mixer unit 200 and the harmonic rejection mixer unit 300. The second low-pass filter 52 passes a Q signal among the transmission signals to the image rejection mixer unit 200 and the harmonic rejection mixer unit 300.

Figure 5:
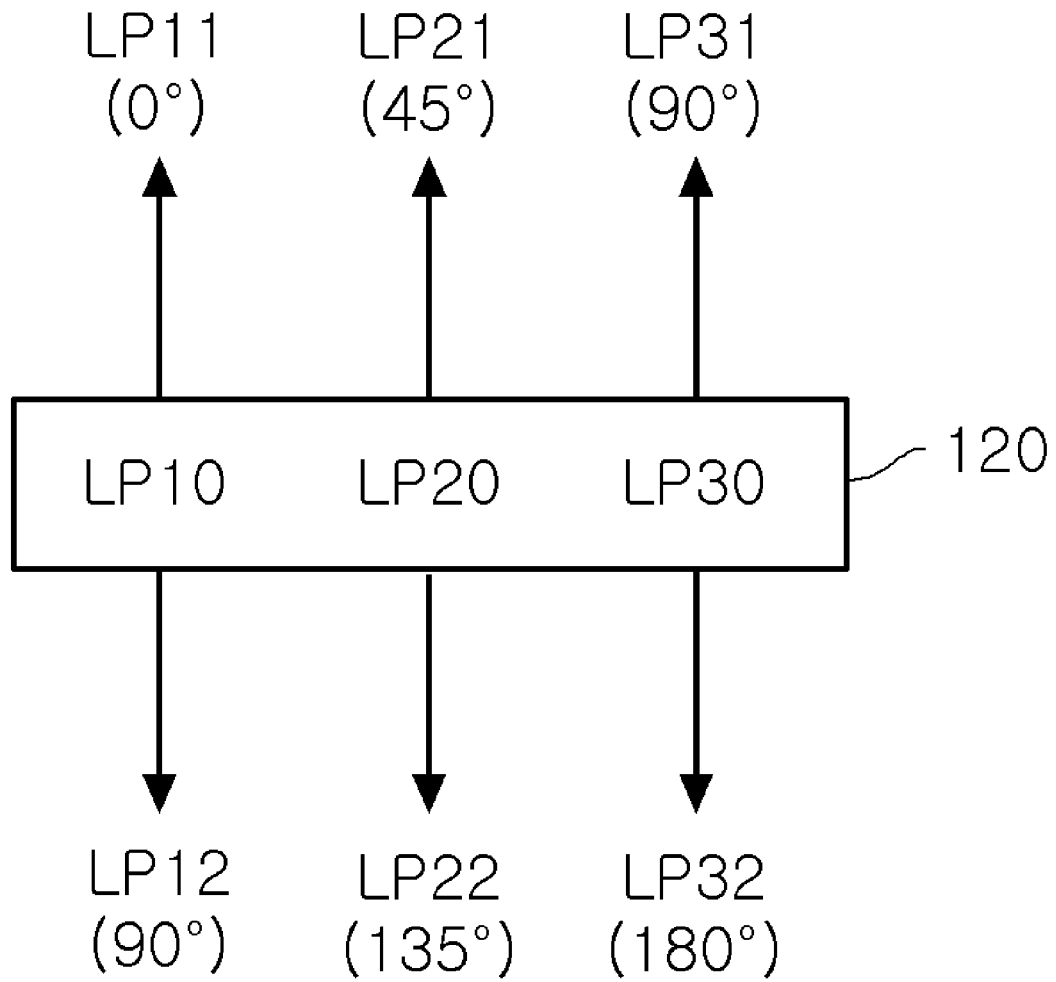
FIG. 5 is an exemplary view illustrating first, second, and third oscillation signal pairs generated by an oscillation generator according to an exemplary embodiment of the present invention.

FIG. 5 is an exemplary view illustrating first, second, and third oscillation signal pairs by an oscillation generator according to an exemplary embodiment of the present invention.

Referring to FIGS. 4 and 5, the local oscillation unit 100 generates first, second, and third oscillation signal pairs LP10, LP20, and LP30 each including a pair of signals having a phase difference. The first, second, and third oscillation signal pairs LP10, LP20, and LP30 include first oscillation signals LP11, LP21, and LP31, and second oscillation signals LP12, LP22, and LP32, respectively. Here, the pairs of first and second oscillation signals have a phase difference of 90°.

Further, the local oscillation unit 100 includes an oscillator 110 and an oscillation generator 120. The oscillator 110 generates an oscillation signal. The oscillation generator 120 generates the first, second, and third oscillation signal pairs LP10, LP20, and LP30 by using the oscillation frequency from the oscillator 110.

Further, referring to FIG. 4, the image rejection mixer unit 200 mixes the transmission signals including the I signal and the Q signal having a phase difference of 90°, with the first oscillation signal pair LP10.

To this end, the image rejection mixer unit 200 may include a first mixer 210 and a second mixer 220. The first mixer 210 mixes the I signal of the transmission signals and the first oscillation signal LP11 of the first oscillation signal pair LP10. The second mixer 220 mixes the Q signal of the transmission signals and the second oscillation signal LP12 of the first oscillation signal pair LP10.

The harmonic rejection mixer unit 300 mixes each of the first, second, and third oscillation signal pairs LP10, LP20, and LP30 with the transmission signals.

To this end, the harmonic rejection mixer unit 300 may include a first harmonic rejection mixer 310 and a second harmonic rejection mixer 320. The first harmonic rejection mixer 310 mixes each of the first oscillation signals LP11, LP21, and LP31 of the first, second, and third oscillation signal pairs LP10, LP20, and LP30 with the transmission signals. The second harmonic rejection mixer 320 mixes each of the second oscillation signals LP12, LP22, and LP32 of the first, second, and third oscillation signal pairs LP10, LP20, and LP30 with the transmission signals.

The output signal selecting unit 500 selects between output signals from the image rejection mixer unit 200 and output signals from the harmonic rejection mixer unit 300.

To this end, the output signal selecting unit 500 includes first and second switches SW10 and SW20, and a third switch SW30. The first and second switches SW10 and SW20 are switched on when a high band is selected in a predetermined communication band, and select the output signals from the image rejection mixer unit 200. The third switch SW30 is switched on when a low band is selected in the predetermined communication band, and selects the output signals from the harmonic rejection mixer unit 300.

Further, when a tunable filter 400 is further included, the tunable filter 400 is connected between the harmonic rejection mixer unit 300 and the third switch SW30. When a low band is selected, the tunable filter 400 removes harmonic components of the output signal created by the harmonic rejection mixer unit 300. At this time, the tunable filter 400 removes preferably seventh and higher harmonics of the oscillation frequency in the signals from the harmonic rejection mixer unit 300.

Figure 6:
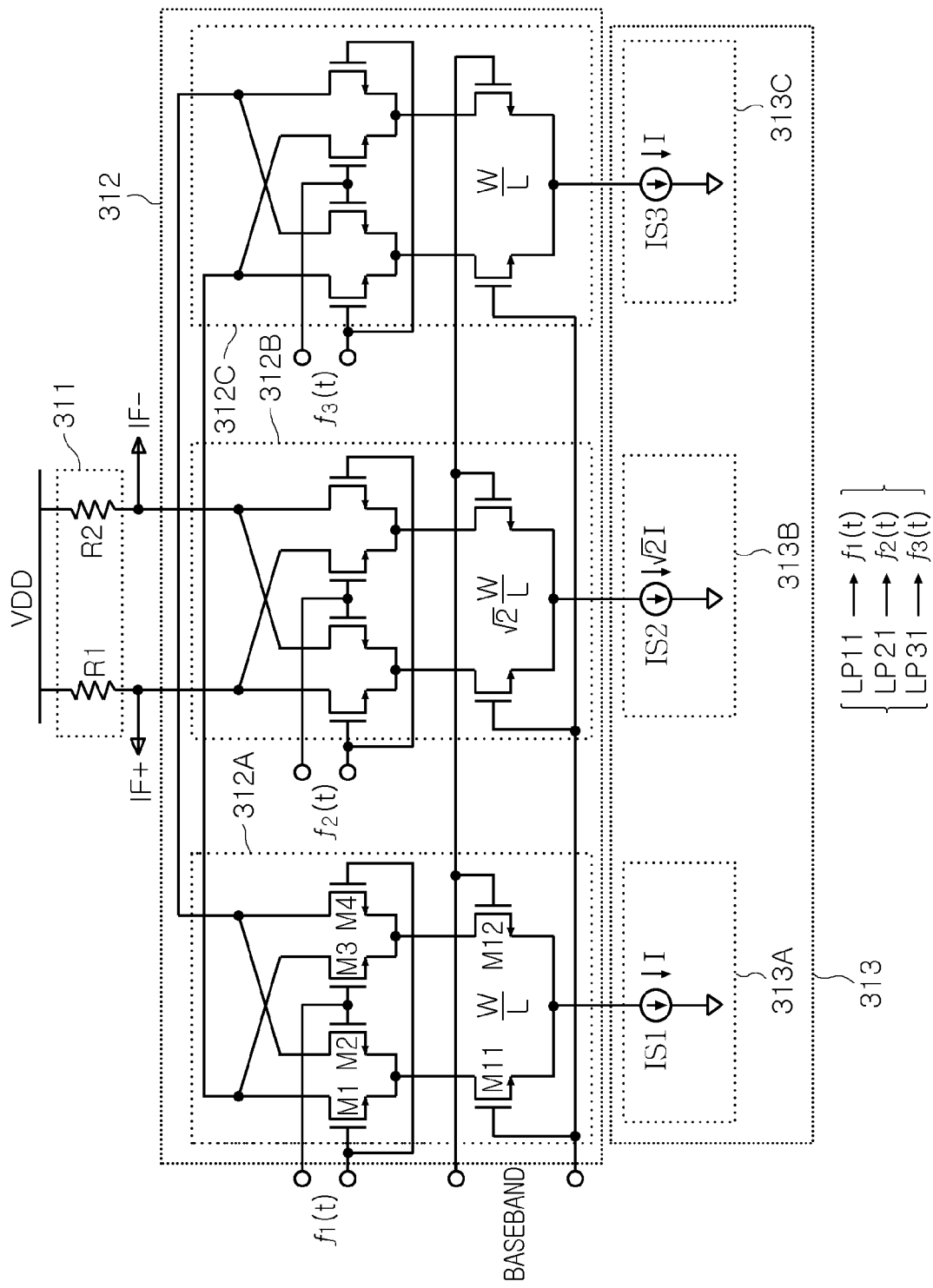
FIG. 6 is a configuration illustrating a harmonic rejection mixer according to an exemplary embodiment of the present invention.

FIG. 6 is a configuration view illustrating a harmonic rejection mixer according to an exemplary embodiment of the present invention.

Referring to FIGS. 4 to 6, the first harmonic rejection mixer 310 includes a load circuit 311, a Gilbert-cell circuit 312, and a current source circuit 313. The load circuit 311 is connected to a power source terminal VDD. The Gilbert-cell circuit 312 is connected to the load circuit 311. Further, the Gilbert-cell circuit 312 is switched on and off alternatively according to each of the first oscillation signals LP11, LP21, and LP31 of the first, second, and third oscillation signal pairs LP10, LP20, and LP30, and mixes the first oscillation signal of each of the first, second, and third oscillation signal pairs with the transmission signals. The current source circuit 313 is connected between the Gilbert-cell circuit 312 and a ground terminal.

The Gilbert-cell circuit 312 includes a first Gilbert-cell 312A, a second Gilbert-cell 312B, and a third Gilbert-cell 312C. The first Gilbert-cell 312A is switched on according to the first oscillation signal LP11 of the first oscillation signal pair LP10, and mixes the first oscillation signal LP11 of the first oscillation signal pair LP10 with the transmission signal. The second Gilbert-cell 312B is switched on according to a first oscillation signal LP21 of the second oscillation signal pair LP20, and mixes the second oscillation signal LP21 of the second oscillation signal pair LP20 with the transmission signals. The third Gilbert-cell 312C is switched on according to the first oscillation signal LP31 of the third oscillation signal pair LP30, and mixes the first oscillation signal LP31 of the third oscillation signal pair LP30 with the transmission signals.

Here, since the Gilbert-cell structure is a well known structure, as shown in FIG. 6, a description thereof will be omitted, and so will an operation thereof.

Further, the current source circuit 313 includes a first current source 313A, a second current source 313B, and a third current source 313C. The first current source 313A keeps a current flowing through the first Gilbert-cell 312A constant. The second current source 313B keeps a current flowing through the second Gilbert-cell 312B constant. The third current source 313C keeps a current flowing through the third Gilbert-cell 312C constant.

The second harmonic rejection mixer 320 has the same load circuit and the same current source circuit as those of the first harmonic rejection mixer 310. However, a Gilbert-cell circuit of the second harmonic rejection mixer 320 is different from that of the first harmonic rejection mixer 310.

The Gilbert-cell circuit of the second harmonic rejection mixer 320 is connected to the load circuit 311. Further, the Gilbert-cell circuit is switched on according to each of the second oscillation signals LP12, LP22, and LP32 of the first, second, and third oscillation signal pairs LP10, LP20, and LP30, and mixes the second oscillation signals LP12, LP22, and LP32 of the first, second, and third oscillation signal pairs LP10, LP20, and LP30 with the transmission signals.

Further, the wide-band direct conversion transmitting apparatus according to the embodiment of the invention may include a fixed filter 600 and a driver amplifier 700. The fixed filter 600 passes a signal selected by the output signal selecting unit 500 within the predetermined frequency band. The driver amplifier 700 amplifies the signal selected by the fixed filter 600.

The wide-band direct conversion transmitting apparatus according to the embodiment of the invention uses a harmonic rejection mixer when using a relatively lower band in the usable frequency band. On the other hand, when using a relatively higher band, the wide-band direct conversion transmitting apparatus uses an image rejection mixer. This will be described with reference to FIGS. 7 and 8.

Figure 7:
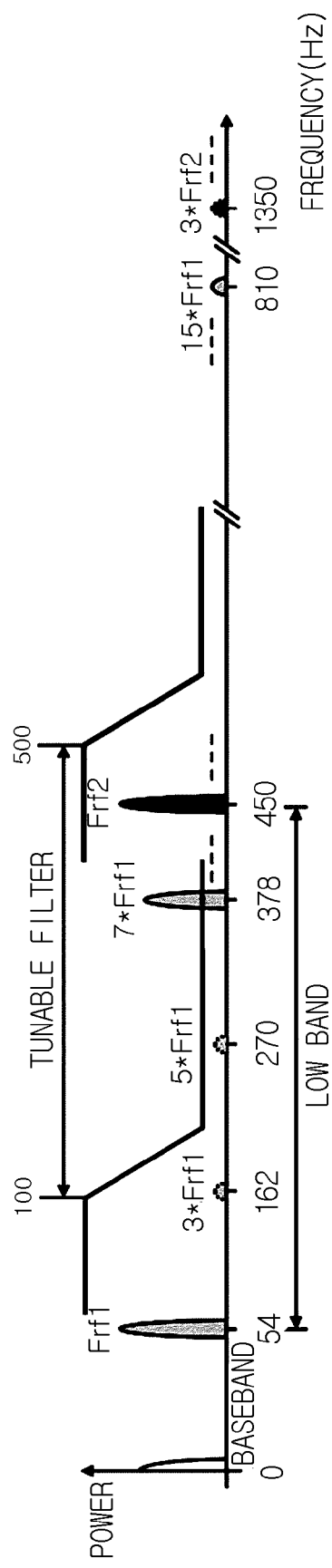
FIG. 7 is a spectrum diagram illustrating a case in which a low band is used in the wide-band direct conversion transmitting apparatus according to the exemplary embodiment of the present invention.

FIG. 7 is a spectrum diagram illustrating a case in which a low band is used in the wide-band direct conversion transmitting apparatus according to the embodiment of the invention.

Referring to FIG. 7, when a harmonic rejection mixer is used at a relatively low band (for example, 54 to 450 MHz) of a usable frequency band (for example, 54 to 860 MHz), third and fifth harmonic components can be removed by the harmonic rejection mixer. Moreover, higher harmonic components can be further removed by the following tunable filter.

Figure 8:
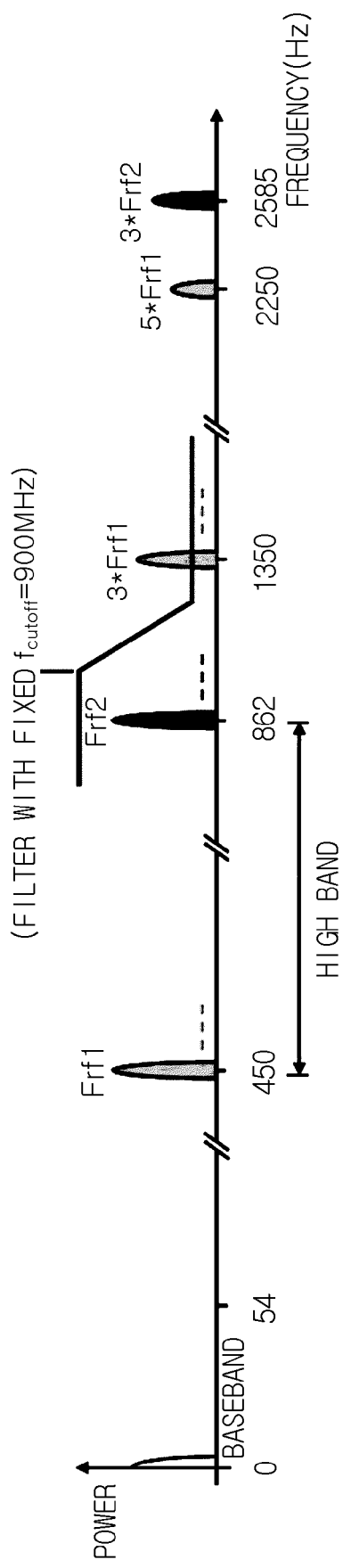
FIG. 8 is a spectrum diagram illustrating a case in which a high band is used in the wide-band direct conversion transmitting apparatus according to the exemplary embodiment of the present invention.

FIG. 8 is a spectrum diagram illustrating a case in which a high band is used in the wide-band direct conversion transmitting apparatus according to the embodiment of the invention.

Referring to FIG. 8, when the image rejection mixer is used at a relatively high band (for example, 450 to 860 MHz) of the usable frequency band, frequency components out of the usable frequency band (for example, 450 to 860 MHz) can be removed by the fixed filter.

Hereinafter, the operation and effect of the invention will be described in detail with reference to the accompanying drawings.

The wide-band direct conversion transmitting apparatus according to the embodiment of the invention will be described with reference to FIGS. 4 to 8. First, in FIG. 4, the first low-pass filter 51 of the wide-band direct conversion transmitting apparatus according to the embodiment of the invention passes the I signal among the transmission signals to the image rejection mixer unit 200 and the harmonic rejection mixer unit 300. The second low-pass filter 52 thereof passes the Q signal among the transmission signals to the image rejection mixer unit 200 and the harmonic rejection mixer unit 300.

Referring to FIGS. 4 and 5, the local oscillation unit 100 generates first, second, and third oscillation signal pairs LP10, LP20, and LP30 each including a pair of signals having different phases.

For example, when the local oscillation unit 100 includes the oscillator 110 and the oscillation generator 120, the oscillator 110 generates an oscillation frequency and transfers the generated oscillation frequency to the oscillation generator 120. The oscillation generator 120 uses the oscillation frequency from the oscillator 110 and generates the first, second, and third oscillation signal pairs LP10, LP20, and LP30.

Here, the first, second, and third oscillation signal pairs LP10, LP20, and LP30 include first oscillation signals LP11, LP21, and LP31, and second oscillation signals LP12, LP22, and LP32, respectively. The first and second oscillation signals have a phase difference of 90°.

Referring to FIG. 4, the image rejection mixer unit 200 mixes the transmission signals including the I signal and the Q signal having the phase difference of 90° with the first oscillation signal pair LP10.

For example, when the image rejection mixer unit 200 includes the first mixer 210 and the second mixer 220, the first mixer 210 mixes the I signal of the transmission signals with the first oscillation signal LP11 of the first oscillation signal pair LP10. The second mixer 220 mixes the Q signal of the transmission signals with the second oscillation signal LP12 of the first oscillation signal pair LP10.

The image rejection mixer unit 200 is used in a upper half band to remove image components when the transmission signals are up-converted. The image rejection is a known technique, and a detailed description thereof will be omitted.

Further, the harmonic rejection mixer unit 300 mixes the first, second, and third oscillation signal pairs LP10, LP20, and LP30 with the transmission signals.

For example, when the harmonic rejection mixer unit 300 includes the first harmonic rejection mixer 310 and the second harmonic rejection mixer 320, the first harmonic rejection mixer 310 mixes the first oscillation signals LP11, LP21, and LP31 of the respective first, second, and third oscillation signal pairs LP10, LP20, and LP30 with the transmission signals. The second harmonic rejection mixer 320 mixes the second oscillation signals LP12, LP22, and LP32 of the respective first, second, and third oscillation signal pairs LP10, LP20, and LP30 with the transmission signals.

The harmonic rejection mixer unit 300 is used in the lower half band, and can remove the third and fifth harmonic components of the up-converted signal.

Then, the output signal selecting unit 500 selects one output signal between the two output signals from the image rejection mixer unit 200 and the harmonic rejection mixer unit 300.

For example, when the output signal selecting unit 500 includes the first and second switches SW10 and SW20, and the third switch SW30, the first and second switches SW10 and SW20 are switched on when a upper half band of the total frequency band is used, and select the output signals from the image rejection mixer unit 200.

Further, when a lower half band of the total frequency band is used, the third switch SW30 is switched on and selects the output signals from the harmonic rejection mixer unit 300.

When the tunable filter 400 that is connected between the harmonic rejection mixer unit 300 and the third switch SW30 is further included, the tunable filter 400 removes harmonic components of the up-converted signal created by the harmonic rejection mixer unit 300. Here, the tunable filter 400 is used to reject harmonic components that are not rejected by the harmonic rejection mixer unit 300. That is, the tunable filter 400 can reject seventh or higher harmonics of the up-converted signal from the harmonic rejection mixer unit 300.

Hereinafter, the first harmonic rejection mixer 310 and the second harmonic rejection mixer 320 will be described.

Referring to FIGS. 4 to 6, in the first harmonic rejection mixer 310, the Gilbert-cell circuit 312 connected between the load circuit 311 and the current source circuit 313 is switched on according to each of the first oscillation signals LP11, LP21, and LP31 of the first, second, and third oscillation signal pairs LP10, LP20, and LP30. Then, the Gilbert-cell circuit 312 mixes each of the first oscillation signals LP11, LP21, and LP31 of the first, second, and third oscillation signal pairs LP10, LP20, and LP30 with the transmission signals, thereby removing the third and fifth harmonic components of the transmission signals and creating pure transmission signals.

Further, in the second harmonic rejection mixer 320, the Gilbert-cell circuit 312 connected between the load circuit 311 and the current source circuit 313 is switched on according to each of the second oscillation signals LP12, LP22, and LP32 of the first, second, and third oscillation signal pairs LP10, LP20, and LP30. The Gilbert-cell circuit 312 mixes each of the second oscillation signals LP12, LP22, and LP32 of the first, second, and third oscillation signal pairs LP10, LP20, and LP30 with the transmission signal, thereby removing third and fifth harmonic components of the transmission signals and creating pure transmission signals.

As described above, the signals chosen by the output signal selecting unit 500 are further filtered by the fixed filter 600 in order to remove the residual harmonic components and then amplified by the driver amplifier 700.

When the relatively low band in the total frequency band is used, the wide-band direct conversion transmitting apparatus according to the embodiment of the invention uses the harmonic rejection mixer.

On the other hand, when the relatively high band is used, the wide-band direct conversion transmitting apparatus according to the embodiment of the invention uses the image rejection mixer. This will be described with reference to FIGS. 7 and 8.

FIG. 7 is a spectrum diagram illustrating a case in which a low band is used in the wide-band direct conversion transmitting apparatus according to the embodiment.

Referring to FIG. 7, when the harmonic rejection mixer is used in the relatively low band of the total frequency band, unwanted harmonic components that fall within the total frequency band can be rejected.

FIG. 8 is a spectrum diagram illustrating a case in which a high band is used in the wide-band direct conversion transmitting apparatus according to the embodiment of the invention.

Referring to FIG. 8, when the image rejection mixer is used in the relatively high band of the total frequency band, frequency components out of the total frequency band can be rejected.

As described above, in the embodiment of the invention, third and fifth harmonic components in the same communication frequency band are rejected by a harmonic rejection mixer (HRM), and seventh or higher harmonic components are rejected by an RF tunable filter having a variable cutoff frequency.

Further, an image rejection mixer (IRM) is used for a fundamental frequency whose third and higher harmonics fall out of the communication frequency band. The third or higher harmonic components outside the communication frequency band can be rejected by a fixed filter.

Further, in the wide-band wireless communication system where a maximum frequency of a wireless communication frequency band is three times larger than a minimum frequency, since third harmonics of an output signal from a transmitting apparatus become an interference signal that interferes communication of an adjacent user, the undesirable third harmonics need to be effectively suppressed.

Therefore, the wide-band direct conversion transmitting apparatus according to the embodiment of the invention includes a harmonic rejection mixer, an image rejection mixer, a tunable filter having a variable cutoff frequency, a fixed filter having a fixed cutoff frequency, and a driver amplifier, and uses wide-band impedance matching.

Through the configuration according to the embodiment of the invention, a wide-band direct conversion transmitting apparatus that effectively removes odd harmonics generated from the final output of the transmitting apparatus can be implemented.

As set forth above, according to the exemplary embodiment of the invention, a transmitting apparatus can be used in a wide band in which a maximum frequency is three times higher than a minimum frequency, remove in-band and out-of-band harmonic components when a low band is selected, and out-of-band harmonic components when a high band is selected.

While the present invention has been shown and described in connection with the exemplary embodiments, it will be apparent to those skilled in the art that modifications and variations can be made without departing from the spirit and scope of the invention as defined by the appended claims.

What is claimed is:

1. A wide-band direct conversion transmitting apparatus comprising:
    a local oscillation unit generating first, second, and third oscillation signal pairs each including a pair of signals having a phase difference of 90°;
    an image rejection mixer unit mixing baseband transmission signals including an I signal and a Q signal having a phase difference of 90° with the first oscillation signal pair;
    a harmonic rejection mixer unit mixing each of the first, second, and third oscillation signal pairs with the baseband transmission signals; and
    an output signal selecting unit selecting output signals from the image rejection mixer unit or from the harmonic rejection mixer unit.

2. The wide-band direct conversion transmitting apparatus of claim 1, wherein the local oscillation unit comprises:
    an oscillator generating an oscillation frequency; and
    an oscillation generator generating the first, second, and the third oscillation signal pairs by using the oscillation frequency from the oscillator.

3. The wide-band direct conversion transmitting apparatus of claim 1, wherein the image rejection mixer unit comprises:
    a first mixer mixing the I signal of the transmission signals with a first oscillation signal of the first oscillation signal pair; and
    a second mixer mixing the Q signal of the transmission signals with a second oscillation signal of the first oscillation signal pair.

4. The wide-band direct conversion transmitting apparatus of claim 1, wherein the harmonic rejection mixer unit comprises:
    a first harmonic rejection mixer mixing a first oscillation signal of each of the first, second, and third oscillation signal pairs with the transmission signals; and
    a second harmonic rejection mixer mixing a second oscillation signal of each of the first, second, and third oscillation signal pairs with the transmission signals.

5. The wide-band direct conversion transmitting apparatus of claim 4, wherein the first harmonic rejection mixer comprises:
    a load circuit connected to a power source terminal;
    a Gilbert-cell circuit connected to the load circuit, switched on according to the first oscillation signal of each of the first, second, and third oscillation signal pairs, and mixing the first oscillation signal of each of the first, second, and third oscillation signal pairs with the transmission signals; and
    a current source circuit connected between the Gilbert-cell circuit and a ground terminal.

6. The wide-band direct conversion transmitting apparatus of claim 4, wherein the second harmonic rejection mixer comprises:
    a load circuit connected to a power source terminal;
    a Gilbert-cell circuit connected to the load circuit, switched on according to the second oscillation signal of each of the first, second, and third oscillation signal pairs, and mixing the second oscillation signal of each of the first, second, and third oscillation signals with the transmission signals.

7. The wide-band direct conversion transmitting apparatus of claim 1, wherein the output signal selecting unit comprises:
   first and second switches switched on when a high band is selected in a predetermined usable frequency band, and selecting output signals from the image rejection mixer unit; and
   a third switch switched on when a low band is selected in the usable frequency band, and selecting output signals from the harmonic rejection mixer unit.

8. The wide-band direct conversion transmitting apparatus of claim 7, further comprising:
   a tunable filter connected between the harmonic rejection mixer unit and the third switch and removing harmonic components of the oscillation frequency in the signal from the harmonic rejection mixer unit.

9. The wide-band direct conversion transmitting apparatus of claim 8, wherein the tunable filter removes seventh or more harmonics in the signal from the harmonic rejection mixer unit.

10. The wide-band direct conversion transmitting apparatus of claim 1, further comprising:
    a first low-pass filter passing the I signal of the transmission signals to the image rejection mixer unit and the harmonic rejection mixer unit; and
    a second low-pass filter passing the Q signal of the transmission signals to the image rejection mixer unit and the harmonic rejection mixer unit.

11. The wide-band direct conversion transmitting apparatus of claim 1, further comprising:
    a fixed filter passing the signals selected by the output signal selecting unit within the predetermined frequency band; and
    a driver amplifier amplifying the signals selected by the fixed filter.

* * * * *

UNITED STATES PATENT AND TRADEMARK OFFICE
CERTIFICATE OF CORRECTION

Page 1 of 1

PATENT NO. : 8,014,466 B2
APPLICATION NO. : 12/194896
DATED : September 6, 2011
INVENTOR(S) : Jun Ki Min et al.

It is certified that error appears in the above-identified patent and that said Letters Patent is hereby corrected as shown below:

On the title page, item 73 the Assignee should read as follows:
SAMSUNG ELECTRO-MECHANICS CO., LTD.

Signed and Sealed this
Twenty-ninth Day of May, 2012

David J. Kappos
*Director of the United States Patent and Trademark Office*